Patented Jan. 9, 1951

2,537,608

UNITED STATES PATENT OFFICE 2,537,608

SELECTIVE CRAB GRASS HERBICIDAL COMPOSITIONS

Miller W. Swaney and Howard L. Yowell, Westfield, and John F. McKay, Jr., Cranford, N. J., assignors to Standard Oil Development Company, a corporation of Delaware No Drawing. Application January 3, 1950, Serial No. 136,648

8 Claims. (Cl. 71—2.3)

This invention relates to improved selective herbicidal oils for the eradication of crab grass. More particularly, this invention relates to crab grass selective herbicidal hydrocarbon oil solutions containing dissolved extremely small amounts of phenyl mercuric acetate.

The problem of growing a lawn of good turf grass free of the rapidly spreading, pestiferous grass known as "crab grass" (*Digitaria sanguinalis* or *Digitaria ischaemum*) has always plagued property owners. Removal of this noxious weed from infested lawns by hand is a time-consuming and tedious operation.

Commercial aqueous preparations which are being marketed for crab grass control such as sodium arsenite preparations or phenylmercuric acetate water compositions are not entirely satisfactory for several reasons. Thus, complete selective kill of the crab grass is usually not obtained and much of the turf grass is severely injured. In many cases, reseeding is necessary. In addition, in most cases, even moderate crab grass control can not be obtained unless the first application of the herbicide is made on lawns when the crab grass is in the seedling stage. The average property owner neglects to treat his lawn at this critical period. It is time-consuming and expensive to make the three or four repeat applications recommended for crab grass control. Rainfall shortly after application washes the toxicant off the grass, making many of the applications ineffective. Since the arsenic and mercury compounds used in commercial crab grass killers are toxic to animals and human beings, and can cause soil sterilization if used repeatedly in high concentrations, it is desirable to use these toxicants in as low a concentration as possible yet still get herbicidal action. The repeated dosages required of the before-mentioned preparations makes it difficult to maintain the concentrations of the active ingredients at these low levels necessary for turf grass and human safety.

It has now been found that particular hydrocarbon oil solutions of phenyl mercuric acetate, i. e., solutions of phenyl mercuric acetate in sulfuric acid-treated kerosenes and particularly solutions of phenyl mercuric acetate in sulfuric acid-treated kerosenes and aromatic extracts of kerosenes, are ideally adapted to overcome the before-mentioned difficulties.

The selective hydrocarbon oil compositions of this invention give "single shot" kills of crab grass with lower concentrations of phenyl mercuric acetate than are required for multi-dose treatments with aqueous solutions of phenyl mercuric acetate. In addition, the compositions of this invention are extremely resistant to weathering, which also contributes to the economy of the use of these compositions.

It is surprising to find that the particular hydrocarbon oil compositions of this invention are superior in selective activity to aqueous solutions of phenyl mercuric acetate because each of the oils singly is unsuited for use as a selective herbicide. Thus, sulfuric acid-treated kerosene is itself completely innocuous on crab grass and turf grasses. The aromatic extracts of kerosene, on the other hand, are contact herbicides and completely "burn up" all foliage indiscriminately. These oils, which are thus unsuitable by themselves as selective crab grass herbicides, cooperate in a synergistic manner with phenyl mercuric acetate to produce compositions of outstanding characteristics as selective crab grass eradicants in ornamental turf.

The sulfuric acid-treated kerosene utilized in the oils of this invention is also known as "Bayol D" and "deodorized kerosene." Its preparation, i. e., by treating kerosene with fuming or concentrated sulfuric acid, is well known in the art. This acid treated kerosene has a specific gravity in the range of 0.775–0.825, a boiling point predominantly in the range of 400°–505° F., and is substantially free of aromatics, i. e. contains only a trace. A typical inspection is as follows:

| | |
|---|---|
| Specific gravity | 0.775–0.825 |
| A. S. T. M. dist., °F.: | |
| I. B. P. | 400 |
| F. B. P. | 505 |
| Mixed aniline point, °F. | 175 |
| Flash point, °F. | 160 |
| Unsulfonated residue_____per cent__ | 97 |
| Sulfur, lamp | 0.02 |
| Color, Saybolt | 25 |
| Per cent aromatics | Trace |

The aromatic extracts of kerosene utilized in the compositions of this invention are prepared by well-known processes of extracting aromatics from kerosene, e. g. extracting kerosene with liquid sulfur dioxide and evaporating the sulfur dioxide from the extract phase or extracting the aromatics with phenol and stripping the phenol from the extract phase.

The aromatic extracts of kerosene employed boil predominantly in the range of 325°–600° F. and have an aromatic content of between 83% and 98%. A typical inspection is as follows:

Specific gravity _____ 0.89
A. S. T. M. dist., °F.:
   I. B. P _____ 325
   F. B. P _____ 580
Mixed aniline point, °F _____ 81
Flash point, °F _____ 140
Per cent aromatics _____ 85

Phenyl mercuric acetate and its preparation is well-known in the art (53 American Society for Horticultural Science 546 et seq.) and need not be given here.

The phenyl mercuric acetate can be dissolved directly in the acid-treated kerosene in which it is soluble to the extent of 0.013 wt. per cent and applied directly to the crab grass infested cultivated area. In general, concentrations in the range of 0.0001 to 0.013 wt. per cent are operative for selective destruction of crab grass. The higher concentration is used when small amounts of oil are to be applied to the cultivated area, e. g., 0.1 gal. per 100 sq. ft., and the lower concentrations are utilized where the amount of oil composition applied is increased.

Three-component systems, i. e., phenyl mercuric acetate, sulfuric acid-treated kerosene, and the aromatic extract of kerosene, are even superior in their action than the before-mentioned two-component oil system. In addition, phenyl mercuric acetate is quite soluble in the aromatic extract of kerosene, i. e., to the extent of 1.35 wt. per cent. This permits of the formulation of solution concentrates of phenyl mercuric acetate which can be economically shipped for subsequent dilution with sulfuric acid-treated kerosene. The concentrations of the ingredients in the three-component system have been found to be quite critical. The phenyl mercuric acetate and aromatic extract of kerosene are present only in minor proportions with the sulfuric acid-treated kerosene present as the major component. The operative ranges in the total compositions are as follows:

Phenyl Mercuric
   acetate _____ 0.0001 to 0.013 wt. per cent and preferably about 0.001 to 0.010 wt. per cent
Aromatic extract of
   kerosene _____ 0.015 to 10 wt. per cent and preferably about 1.0 to 6.0 wt. per cent These ranges are applicable for compositions which are to be applied to cultivated areas at a rate of one gallon per hundred square feet of cultivated area. The amount of phenyl mercuric acetate and the aromatic extract of kerosene varies approximately inversely as the amount of the composition applied to the cultivated area. Typical formulations are indicated in the detailed examples listed below.

The following examples illustrate this invention and indicate test results obtained on the compositions of this invention.

EXAMPLE I

C. P. phenyl mercuric acetate was dissolved in sulfuric acid-treated kerosene at a concentration of 0.006 wt. per cent. This oil composition was then applied directly in the form of a fine spray to a plot of lawn composed mainly of blue grass (Poa pratensis) and clover heavily infested with crab grass. The rate of application was one gallon of herbicide per hundred square feet of lawn. A 0.0175 wt. per cent aqueous solution of solubilized phenyl mercuric acetate and a 0.05 wt. per cent aqueous solution of sodium arsenite were likewise applied to adjoining plots of lawn at rates of one gallon and one-half gallon respectively per hundred square feet of lawn (concentrations and application rates as recommended by manufacturers). Results are listed in Table I.

Table I

| Herbicide | Observations 17 days after Application | | |
|---|---|---|---|
| | Crab Grass | Turf Grass | Clover |
| Phenyl mercuric acetate solution in sulfuric acid-treated kerosene. | Dead | No kill. Very slight discoloration. | No injury. |
| Pheny mercuric acetate aqueous solution. (A solubilized proprietary product.) | Moderate discoloration. No kill. | Moderate discoloration | Moderate discoloration. |
| Sodium arsenite solution | Slight injury | Dead | Dead. |

This example indicates particularly that the composition of this invention was superior to a three times as concentrated aqueous solution of phenyl mercuric acetate.

EXAMPLE II

A 0.002 wt. per cent solution of C. P. phenyl mercuric acetate in sulfuric acid-treated kerosene was applied as in Example I to a similar plot of lawn at an application rate of one gallon of herbicide per hundred square feet of lawn. Results are listed in Table II.

Table II

[Observations 17 days after application]

| Crab Grass | Turf Grass | Clover |
|---|---|---|
| Dead | No kill. Very slight discoloration | No injury. |

This example indicates the efficacy of even very dilute solutions of phenyl mercuric acetate in the oils of this invention.

EXAMPLE III

A 0.01 wt. per cent solution of C. P. phenyl mercuric acetate in Bayol D, was applied as in Example I to similar plots of lawns at application rates of 0.2 gallon and 0.1 gallon of herbicide per hundred square feet of lawn. Results are listed in Table III.

Table III

| Application Rate, gal./100 sq. ft. of Lawn | Observations 6 Days After Application | | |
|---|---|---|---|
| | Crab Grass | Turf Grass | Clover |
| 0.2 | Stunting of growth and discoloration. | No injury | No injury. |
| 0.1 | ____do____ | ____do____ | Do. |

This example illustrates the manner in which more concentrated solutions of phenyl mercuric acetate can be utilized to achieve economy of spraying.

EXAMPLE IV 1.3 wt. per cent of C. P. phenyl mercuric acetate was dissolved in a sulfur dioxide aromatic kerosene extract. One per cent of this solution was mixed with 99% of sulfuric acid-treated kerosene. This composition, having an overall concentration of 0.013% phenyl mercuric acetate, was then applied directly in the form of a fine spray to a plot of lawn composed mainly of blue grass (Poa pratensis) heavily infested with mature crab grass. The rate of application was 0.2 gallon per hundred square feet of lawn. 0.01 wt. per cent of phenyl mercuric acetate was dissolved directly in sulfuric acid-treated kerosene and this crab grass killer applied to an adjoining plot of lawn at the same rate. A 0.0175% aqueous solution of phenyl mercuric acetate was likewise applied to an adjoining plot of lawn at a rate of one gallon per hundred square feet of lawn. Results are listed below in terms of wt. per cent in Table IV.

*Table IV*

| Herbicide | Application Rate, gal./100 sq. ft. | Observations 3 Days After Application | |
|---|---|---|---|
| | | Crab Grass | Turf Grass |
| 99% sulfuric acid-treated kerosene<br>0.987% aromatic extract of kerosene<br>.013% phenyl mercuric acetate | 0.2 | Discolored and stunted | No injury. |
| 99.99% sulfuric acid-treated kerosene<br>0.01% phenyl mercuric acetate | 0.2 | Slight discoloration | Do. |
| 99.98% water<br>0.0175% phenyl mercuric acetate (a solubilized proprietary product) | 1.0 | No injury | Do. |

This example indicates that solutions containing aromatic extracts of kerosene were superior in rapidity of action to the hydrocarbon solution that did not contain the aromatic kerosene extract. Both hydrocarbon solutions, however, were far superior to the aqueous solution of phenyl mercuric acetate, even where the latter was both more concentrated than the hydrocarbon solutions and was applied in a total amount five times as great as the hydrocarbon solutions.

The compositions of this invention are applied by suitable spray equipment to lawns which are infested with crab grass. The crab grass is rapidly discolored, stunted and killed. Heading and the possibility of the crab grass reseeding itself is eliminated, but desirable turf grasses are not injured appreciably and continue to grow lushly. Excellent crab grass control is obtained with the compositions of this invention, even though the crab grass is fully matured when the eradicants are applied. The dangers of soil sterilization and toxic effects on animals and human beings are minimized because of the lower concentrations of metal salts than is used in the prior art. Clover, which frequently is a desirable component of a lawn, is uninjured by the herbicides of this invention. Results in terms of crab grass stunting and destruction are often apparent the next day through the use of the compositions of this invention.

It is to be understood that this invention is not limited to the specific examples which have been offered merely as illustrations and that modifications may be made without departing from the spirit of this invention.

What is claimed is:

1. A selective crab grass herbicide concentrate solution composition comprising a solution of phenyl mercuric acetate in an aromatic extract of kerosene, said aromatic extract boiling in the range of 325°–600° F. and having an aromatic content of between 83% and 98%.

2. A concentrate solution composition as in claim 1 in which the solution is saturated with respect to the phenyl mercuric acetate.

3. A selective crab grass herbicide composition comprising a solution of phenyl mercuric acetate in a sulfuric acid-treated kerosene, said acid-treated kerosene having a specific gravity in the range of 0.775–0.825, a boiling point predominantly in the range of 400°–505° F., and being substantially free of aromatics.

4. A herbicidal composition as in claim 3 in which the amount of phenyl mercuric acetate present in the solution is in the range of 0.0001 to 0.013 wt. percent.

5. A selective crab grass herbicide solution composition comprising in combination a minor proportion of phenyl mercuric acetate and a minor proportion of an aromatic extract of kerosene, said aromatic kerosene extract boiling in the range of 325°–600° F. and having an aromatic content of between 83% and 98%, in a major proportion of a sulfuric acid-treated kerosene, said acid-treated kerosene having a specific gravity in the range of 0.775–0.825, a boiling point predominantly in the range of 400°–505° F., and being substantially free of aromatics.

6. A selective herbicidal composition as in claim 5 in which the amount of phenyl mercuric acetate present varies in the range of 0.0001 to 0.013 wt. percent, and the amount of the aromatic extract of kerosene varies in the range of 0.015 to 10 wt. percent.

7. A composition as in claim 6 in which the amount of phenyl mercuric acetate is in the range of about 0.001 to 0.010 wt. percent and the amount of the aromatic extract of kerosene is in the range of about 1.0 to 6.0 wt. percent.

8. A selective crab grass herbicidal spray composition adapted for application at the rate of approximately 0.2 gallon of herbicidal composition per one hundred square feet of cultivated area consisting essentially of about 99 wt. percent sulfuric acid-treated kerosene, said acid-treated kerosene having a specific gravity in the range of 0.775–0.825, a boiling point predominantly in the range of 400°–505° F. and being substantially free of aromatics, about 0.98 wt. percent sulfur dioxide aromatic extract of kerosene, said aromatic extract of kerosene having a boiling point in the range of 325°–600° F. and an aromatic content of between 83 and 98%, and about 0.013 wt. percent phenyl mercuric acetate.

MILLER W. SWANEY.
HOWARD L. YOWELL.
JOHN F. McKAY, Jr.

No references cited.